G. SCHROEDER.
TRAP NEST.
APPLICATION FILED JULY 10, 1915.

1,178,953.

Patented Apr. 11, 1916.
2 SHEETS—SHEET 1.

Witnesses
Inventor
G. Schroeder,
By Victor J. Evans
Attorney

G. SCHROEDER.
TRAP NEST.
APPLICATION FILED JULY 10, 1915.

1,178,953.

Patented Apr. 11, 1916.
2 SHEETS—SHEET 2.

Witnesses

Inventor
G. Schroeder,
By Victor J. Evans
Attorney

UNITED STATES PATENT OFFICE.

GUSTAV SCHROEDER, OF NEW YORK, N. Y.

TRAP-NEST.

1,178,953.  Specification of Letters Patent.  Patented Apr. 11, 1916.

Application filed July 10, 1915. Serial No. 39,171.

*To all whom it may concern:*

Be it known that I, GUSTAV SCHROEDER, a citizen of the United States, residing at New York, in the county of New York and State of New York, have invented new and useful Improvements in Trap-Nests, of which the following is a specification.

This invention relates to certain novel and useful improvements in trap nests.

In carrying out the present invention, it is my purpose to provide a trap nest which will be automatically closed when the hen enters the next box and wherein the nest box may be readily and conveniently removed whenever desired.

Another object of my invention is to improve and simplify the general construction of trap nests and to provide a trap nest wherein the component parts will be so arranged and correlated as to reduce the possiblity of derangement to a minimum and which will be constructed in such manner that the hen will leave the nest box after laying the egg, thereby preventing breaking of the egg, and enter the vision of the attendant so that such hen may be released from the nest.

With the above and other objects in view, the invention consists in the construction, combination and arrangement of parts hereinafter set forth in and falling within the scope of the claims.

Figure 1:
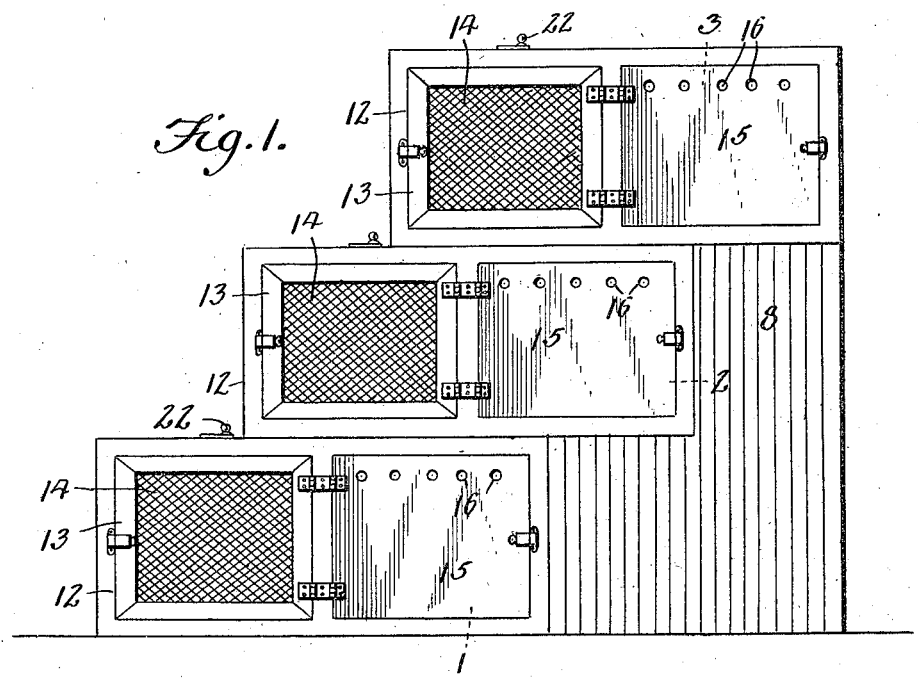
Figure 2:
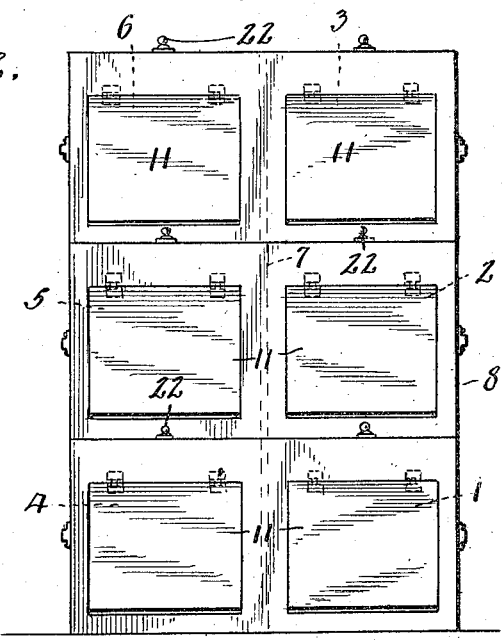
Figure 3:
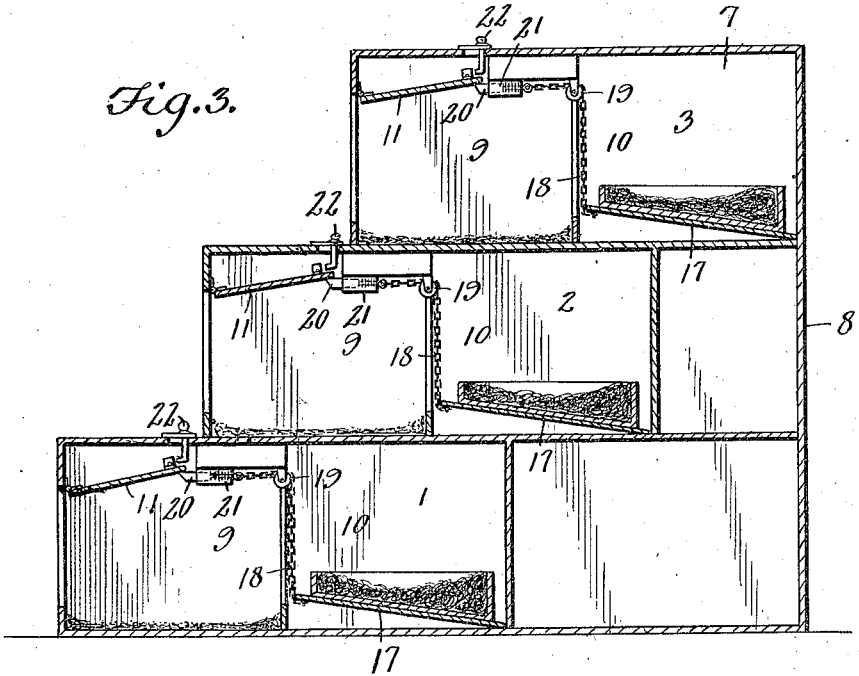
Figure 4:
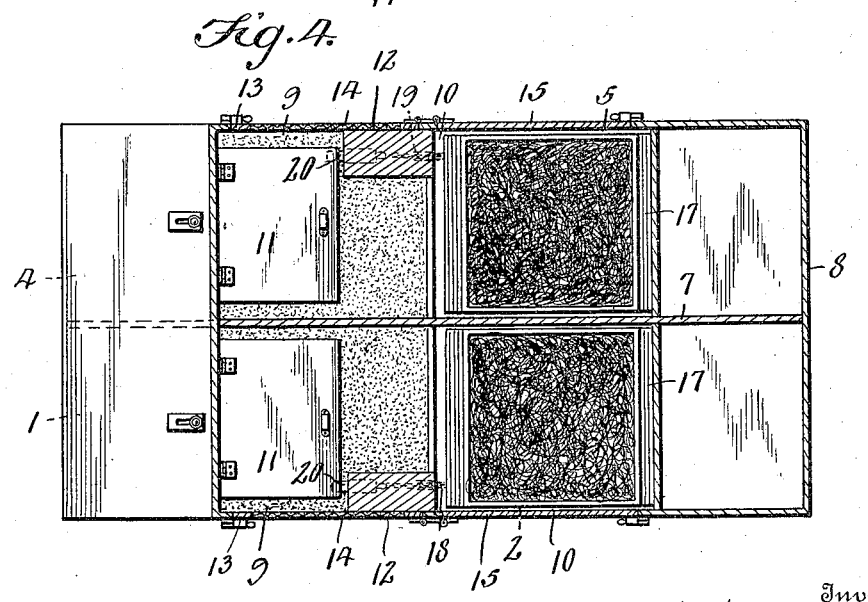

In the accompanying drawings: Figure 1 is a view in side elevation of a multiple trap nest constructed in accordance with the present invention. Fig. 2 is a front elevation thereof. Fig. 3 is a vertical sectional view therethrough. Fig. 4 is a horizontal sectional view through the same.

Referring now to the drawings in detail, 1, 2 and 3 designate trap nests arranged one upon the other in stepped relation, while 4, 5 and 6 designate similar nests arranged in a like manner and arranged at the side of the nests 1, 2 and 3 respectively and divided from such nests 1, 2 and 3 by means of a common vertical partition 7. The rearwardly projecting ends of the trap nests in the two vertical rows just described are supported upon and secured to suitable framework 8 and the rear wall of the frame 8 is arranged vertically so as to present an uninterrupted surface.

Each trap nest comprises an entrance compartment 9 and a nest compartment 10 communicating with each other. The front wall of the entrance compartment 9 is formed with a door opening and hinged to the upper edge wall of such opening is a trap door 11 adapted to gravitate to closed position. The outer side wall of the entrance compartment is also formed with a door opening and hinged to one side edge wall of the door opening in the side wall of the entrance compartment is a door 12 formed of an outer rectangular frame 13 and a panel 14 of foraminous material. The outer side wall of each nest compartment 10 is formed with a door opening and hinged to one side wall of such door opening is a door 15 preferably formed of sheet metal, although any other material may be used, and having a series of ventilating openings 16 formed therein adjacent to the upper edge thereof. Mounted upon the bottom of the nest compartment 10 of each trap nest is a plate 17 and one end of the plate 17 engages the bottom of the nest compartment at the rear thereof; while the opposite edge of such plate is connected with the lower end of a chain 18 and the remaining end of the chain 18 is trained over a sheave 19 rotatably mounted within a block secured to the top wall of the trap nest at the juncture of the entrance and nest compartments and is then connected with a spring actuated bolt 20 slidably mounted within a suitable guide 21 carried by the top wall of the nest. The spring of the bolt 20 holds the latter normally in the path of movement of the trap door 11 and is designed to hold the trap door elevated so that the front end of the entrance compartment of the trap nest will be opened. Resting upon the plate 17 in the nest compartment of each trap nest is a nest box 21 filled with straw, excelsior or analogous material. This nest box rests loosely upon the plate 17 and is removable from the nest compartment so that the box may be cleaned.

In practice, the trap door 11 is held elevated by the spring actuated bolt 20 and as long as the nest box 21 is empty the bolt maintains the trap door open. The hen, desiring to enter the nest, passes through the opening controlled by the trap door 11 and into the entrance compartment 9 and passes from the entrance compartment into the nest compartment 10. The hen when entering the nest compartment steps into the nest box 21 and as the weight is placed upon the plate 17 the latter descends and so pulls the chain 18, thereby retracting the bolt 20 and releasing the trap door 11 so that the latter may gravitate to closed position. Owing to the foraminous panel 14 in the door 12 in the side wall of the entrance compartment, the entrance compartment is relatively bright, while the nest compartment is dark, owing to the door 15. When the egg has been laid the hen steps from the nest compartment into the entrance compartment and is within the vision of the attendant so that such attendant may open the door 12 to release the hen.

The lower edge wall of the door openings in the front and side walls of the entrance compartment 9 are disposed above the bottom wall of such compartment and the bottom wall of the entrance compartment of each trap nest is preferably covered with suitable soft material, such as sawdust, straw or the like.

When it is desired to employ the device as an ordinary nest, suitable means is provided to hold the trap door 11 of the nest in open position so that when the bolt 20 is retracted under the action of the weight of the hen on the plate 17, the trap door will be maintained open. In the present instance, this holding means comprises a hand operated bolt 22 slidably mounted in the top wall of the entrance compartment of each trap nest and capable of movement to engage the trap door 11 to hold the latter in open position.

It will, of course, be understood that any number of trap nests may be embodied in a unit and each unit constructed of any desired material, such as wood, metal, etc., while the dimensions of the trap nests may be varied, without departing from the spirit of my invention.

I claim:

1. A trap nest comprising entrance and closed compartments, the entrance compartment having the front wall thereof formed with a door opening and one side thereof formed with a door opening, a trap door hinged to the top edge wall of the door opening in the front wall of said entrance compartment, a spring actuated bolt holding said trap door normally elevated, a nest box in said nest compartment, capable of downward movement under the weight of the hen, a connection between said nest box and said bolt whereby the latter will be retracted to release said trap door in the downward movement of said supporting means, a door closing the opening in the side wall of said entrance compartment and having a transparent panel therein, and a hand operated bolt slidably mounted in the top wall of said entrance compartment and operable to hold said trap door elevated independently of said spring actuated bolt.

2. A trap nest comprising entrance and nest compartments, the entrance compartment having the front wall thereof formed with a door opening, a trap door hinged to the top edge wall of the door opening in the front wall of said entrance compartment, a nest box in said nest compartment, means holding said nest box normally elevated, and said door normally elevated and adapted to release said door in the downward movement of said nest under the weight of the hen whereby the door may swing to closed position, and a hand operated bolt slidably mounted in the top wall of said entrance compartment and operable to hold said trap door normally elevated independently of said holding means.

In testimony whereof I affix my signature in presence of two witnesses.

GUSTAV SCHROEDER.

Witnesses:
GEORGE LETAUHENY,
WILLIAM F. HEISERMAN.

Copies of this patent may be obtained for five cents each, by addressing the "Commissioner of Patents, Washington, D. C."